US010614517B2

(12) United States Patent
Jones-McFadden et al.

(10) Patent No.: US 10,614,517 B2
(45) Date of Patent: Apr. 7, 2020

(54) SYSTEM FOR GENERATING USER EXPERIENCE FOR IMPROVING EFFICIENCIES IN COMPUTING NETWORK FUNCTIONALITY BY SPECIALIZING AND MINIMIZING ICON AND ALERT USAGE

(71) Applicant: BANK OF AMERICA CORPORATION, Charlotte, NC (US)

(72) Inventors: Alicia C. Jones-McFadden, Fort Mill, SC (US); Matthew Hsieh, Charlotte, NC (US); Scott R. Enscoe, Charlotte, NC (US); Elizabeth Ann Miller, Brooklyn, NY (US); Alicia Anli Salvino, Rockville, MD (US); Daniel Shilov, Nashua, NH (US); Michael Anderson, Colleyville, TX (US); Raghav Anand, Chadds Ford, PA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 746 days.

(21) Appl. No.: 15/288,805

(22) Filed: Oct. 7, 2016

(65) Prior Publication Data
US 2018/0101901 A1    Apr. 12, 2018

(51) Int. Cl.
G06Q 40/02      (2012.01)
(52) U.S. Cl.
CPC .................................. *G06Q 40/02* (2013.01)
(58) Field of Classification Search
CPC ................................ G06Q 40/02; G08B 21/18
(Continued)

(56) References Cited

U.S. PATENT DOCUMENTS 5,864,684 A    1/1999 Nielson
5,918,217 A    6/1999 Maggioncalda et al.
(Continued)

FOREIGN PATENT DOCUMENTS

CA    2626172 A1    11/2009
CA    2629653 A1    11/2009
(Continued)

OTHER PUBLICATIONS

Egele, Manuel, et al., "COMPA: Detecting Compromised Accounts on Social Networks", NDSS 2013, San Diego, CA, Feb. 24-27, 3013, 17 pages.
(Continued)

*Primary Examiner* — Robert R Niquette
(74) *Attorney, Agent, or Firm* — Michael A. Springs; Moore & Van Allen PLLC; Nicholas C. Russell

(57) ABSTRACT

An entity system comprises a network communication interface and a memory device storing an alert application. A processing device is operatively coupled to the memory device and is configured to execute computer-readable program code to: transmit alerts to a user device in response to alert conditions; monitor responses to the alert from the user device; and alter the visual appearance of the alerts at the user device based on the results of monitoring the responses. The processing device may be configured to execute computer-readable program code to select from at least two different types of alerts. The two different types of alerts may comprise different icons having different visual appearances. The two different types of alerts may be associated with different alert conditions. The entity system may transmit a message to the user device such that the alerts are displayed on the user device without being displayed in-line with associated transaction information and/or disabling the alerts such that the alerts are not displayed.

16 Claims, 13 Drawing Sheets

(58) Field of Classification Search
USPC .................................................. 705/35–45
See application file for complete search history.

(56) References Cited

U.S. PATENT DOCUMENTS

| | | | |
|---|---|---|---|
| 6,012,044 A | 1/2000 | Maggioncalda et al. | |
| 6,278,993 B1 | 8/2001 | Kumar et al. | |
| 6,327,578 B1 | 12/2001 | Linehan | |
| 6,629,081 B1 | 9/2003 | Cornelius et al. | |
| 6,633,910 B1 | 10/2003 | Rajan et al. | |
| 6,782,374 B2 | 8/2004 | Nichols | |
| 6,829,334 B1 | 12/2004 | Zirngibl et al. | |
| 6,892,192 B1 | 5/2005 | Geddes et al. | |
| 7,085,834 B2 | 8/2006 | Delany et al. | |
| 7,092,992 B1 | 8/2006 | Yu | |
| 7,103,556 B2 | 9/2006 | Del Rey et al. | |
| 7,165,041 B1 | 1/2007 | Guheen et al. | |
| 7,296,734 B2 | 11/2007 | Pliha | |
| 7,363,339 B2 | 4/2008 | Delany et al. | |
| 7,364,071 B2 | 4/2008 | Esplin et al. | |
| 7,406,537 B2 | 7/2008 | Cullen | |
| 7,412,534 B2 | 8/2008 | Tsang et al. | |
| 7,444,304 B2 | 10/2008 | Mellinger et al. | |
| 7,486,780 B2 | 2/2009 | Zirngibl et al. | |
| 7,624,073 B1 | 11/2009 | Robinson et al. | |
| 7,672,879 B1 | 3/2010 | Kumar et al. | |
| 7,698,190 B2 | 4/2010 | Penkalski et al. | |
| 7,774,257 B2 | 8/2010 | Maggioncalda et al. | |
| 7,788,147 B2 | 8/2010 | Haggerty et al. | |
| 7,797,267 B2 | 9/2010 | Horvitz | |
| 7,813,989 B2 | 10/2010 | Jones et al. | |
| 7,860,774 B1 | 12/2010 | Peterson et al. | |
| 7,912,770 B2 | 3/2011 | Haggerty et al. | |
| 8,060,423 B1 | 11/2011 | Rukonic et al. | |
| 8,073,759 B1 | 12/2011 | Del Favero et al. | |
| 8,122,123 B2 | 2/2012 | Bhattacharya et al. | |
| 8,135,655 B2 | 3/2012 | Oaten et al. | |
| 8,260,699 B2 | 9/2012 | Smith et al. | |
| 8,306,894 B2 | 11/2012 | Newman et al. | |
| 8,346,568 B1 | 1/2013 | Del Favero et al. | |
| 8,396,791 B2 | 3/2013 | Cotton | |
| 8,407,137 B2 | 3/2013 | Thomas | |
| 8,429,038 B1 | 4/2013 | Harman et al. | |
| 8,458,051 B1 | 6/2013 | Saltzman et al. | |
| 8,473,380 B2 | 6/2013 | Thomas et al. | |
| 8,494,936 B2 | 7/2013 | Brenner | |
| 8,515,828 B1 | 8/2013 | Wolf et al. | |
| 8,594,283 B2 | 11/2013 | Hogan et al. | |
| 8,639,567 B2 | 1/2014 | Winters | |
| 8,639,638 B2 | 1/2014 | Shae et al. | |
| 8,682,793 B2 | 3/2014 | Carlson et al. | |
| 8,713,090 B2 | 4/2014 | Sadovsky et al. | |
| 8,719,132 B1 | 5/2014 | Diggdon et al. | |
| 8,732,073 B2 | 5/2014 | Thomas | |
| 8,768,736 B1 | 7/2014 | Chapman et al. | |
| 8,768,800 B2 | 7/2014 | Milosavljevic et al. | |
| 8,768,833 B2 | 7/2014 | Freishtat et al. | |
| 8,788,661 B2 | 7/2014 | Raleigh | |
| 8,825,759 B1 | 9/2014 | Jackson et al. | |
| 8,930,217 B2 | 1/2015 | Feinschreiber et al. | |
| 8,935,342 B2 | 1/2015 | Patel | |
| 9,098,387 B1 | 8/2015 | Curtis et al. | |
| 9,256,876 B2 | 2/2016 | Vasant Akole et al. | |
| 9,286,637 B1 | 3/2016 | Keld et al. | |
| 9,411,942 B2 | 8/2016 | Commons et al. | |
| 9,460,443 B1 | 10/2016 | Curtis et al. | |
| 2002/0174185 A1 | 11/2002 | Rawat et al. | |
| 2002/0180786 A1 | 12/2002 | Tanner | |
| 2003/0120593 A1 | 6/2003 | Bansal et al. | |
| 2003/0139986 A1 | 7/2003 | Roberts, Jr. | |
| 2003/0206554 A1 | 11/2003 | Dillon | |
| 2004/0107125 A1 | 6/2004 | Guheen et al. | |
| 2004/0138959 A1 | 7/2004 | Hlavac et al. | |
| 2004/0153413 A1 | 8/2004 | Gross | |
| 2004/0162773 A1 | 8/2004 | Del Rey et al. | |
| 2004/0175680 A1 | 9/2004 | Hlavac et al. | |
| 2004/0181591 A1 | 9/2004 | Yu et al. | |
| 2004/0189702 A1 | 9/2004 | Hlavac et al. | |
| 2005/0187862 A1 | 8/2005 | Dheer et al. | |
| 2006/0014535 A1 | 1/2006 | Walker et al. | |
| 2006/0224046 A1 | 10/2006 | Ramadas et al. | |
| 2006/0265201 A1 | 11/2006 | Martin | |
| 2006/0288023 A1 | 12/2006 | Szabo | |
| 2007/0021200 A1 | 1/2007 | Fox et al. | |
| 2007/0112906 A1 | 5/2007 | Liu et al. | |
| 2007/0167689 A1 | 7/2007 | Ramadas et al. | |
| 2007/0174448 A1 | 7/2007 | Ahuja et al. | |
| 2007/0286099 A1 | 12/2007 | Stocklein et al. | |
| 2008/0014908 A1 | 1/2008 | Vasant | |
| 2008/0034045 A1 | 2/2008 | Bardsley | |
| 2008/0086409 A1 | 4/2008 | Moorman et al. | |
| 2008/0114677 A1* | 5/2008 | Keohane | G06Q 20/1085 705/43 |
| 2008/0133734 A1 | 6/2008 | Jacobs et al. | |
| 2009/0024984 A1 | 1/2009 | Maeda | |
| 2009/0106171 A1 | 4/2009 | Hlavac et al. | |
| 2009/0124349 A1 | 5/2009 | Dawson et al. | |
| 2009/0132395 A1 | 5/2009 | Lam et al. | |
| 2009/0276288 A1 | 11/2009 | Hlavac et al. | |
| 2010/0017619 A1 | 1/2010 | Errico | |
| 2010/0100470 A1 | 4/2010 | Buchanan et al. | |
| 2010/0121808 A1 | 5/2010 | Kuhn | |
| 2010/0257066 A1 | 10/2010 | Jones et al. | |
| 2010/0299252 A1 | 11/2010 | Thomas | |
| 2010/0306080 A1 | 12/2010 | Trandal et al. | |
| 2010/0325047 A1* | 12/2010 | Carlson | G06Q 20/04 705/44 |
| 2010/0332373 A1 | 12/2010 | Crabtree et al. | |
| 2010/0332583 A1 | 12/2010 | Szabo | |
| 2011/0066505 A1 | 3/2011 | Hammad | |
| 2011/0106775 A1 | 5/2011 | Arbo et al. | |
| 2011/0131130 A1 | 6/2011 | Griffin et al. | |
| 2011/0145056 A1 | 6/2011 | Sullivan et al. | |
| 2011/0213686 A1 | 9/2011 | Ferris et al. | |
| 2011/0275344 A1 | 11/2011 | Momtahan et al. | |
| 2012/0010933 A1 | 1/2012 | Satyavolu et al. | |
| 2012/0016858 A1 | 1/2012 | Rathod | |
| 2012/0122570 A1 | 5/2012 | Baronoff | |
| 2012/0155296 A1 | 6/2012 | Kashanian | |
| 2012/0173700 A1 | 7/2012 | De Andrade Cajahyba et al. | |
| 2012/0179564 A1 | 7/2012 | Soroca et al. | |
| 2012/0185368 A1 | 7/2012 | Schloter et al. | |
| 2012/0197794 A1 | 8/2012 | Grigg et al. | |
| 2012/0215640 A1 | 8/2012 | Ramer et al. | |
| 2012/0221446 A1 | 8/2012 | Grigg et al. | |
| 2012/0330971 A1 | 12/2012 | Thomas et al. | |
| 2013/0006883 A1 | 1/2013 | McKeown et al. | |
| 2013/0024203 A1 | 1/2013 | Flores et al. | |
| 2013/0041819 A1 | 2/2013 | Khasho | |
| 2013/0054681 A1 | 2/2013 | Coyne | |
| 2013/0080641 A1 | 3/2013 | Lui et al. | |
| 2013/0110640 A1 | 5/2013 | Powell et al. | |
| 2013/0176908 A1 | 7/2013 | Baniel et al. | |
| 2013/0227027 A1 | 8/2013 | May et al. | |
| 2013/0262312 A1* | 10/2013 | Carlson | G06Q 20/04 705/44 |
| 2013/0325598 A1 | 12/2013 | Shao et al. | |
| 2013/0325681 A1 | 12/2013 | Somashekar et al. | |
| 2014/0025491 A1 | 1/2014 | Nagarajan et al. | |
| 2014/0136381 A1 | 5/2014 | Joseph et al. | |
| 2014/0172560 A1 | 6/2014 | Satyavolu et al. | |
| 2014/0207584 A1 | 7/2014 | Wicha et al. | |
| 2014/0236846 A1 | 8/2014 | Melika et al. | |
| 2014/0278755 A1 | 9/2014 | Eberl et al. | |
| 2014/0279639 A1 | 9/2014 | Cooper et al. | |
| 2014/0279800 A1 | 9/2014 | Anastasopoulos | |
| 2014/0289154 A1 | 9/2014 | Cooper et al. | |
| 2014/0289386 A1 | 9/2014 | Vatto et al. | |
| 2014/0335819 A1 | 11/2014 | Jahr | |
| 2014/0365354 A1 | 12/2014 | Shvarts | |
| 2015/0026053 A1* | 1/2015 | Calman | G06Q 20/108 705/42 |
| 2015/0046307 A1 | 2/2015 | Calman et al. | |
| 2015/0079929 A1 | 3/2015 | McNamee et al. | |

(56) References Cited

U.S. PATENT DOCUMENTS

| | | |
|---|---|---|
| 2015/0082458 A1 | 3/2015 | Cooper et al. |
| 2015/0095132 A1 | 4/2015 | Van Heerden et al. |
| 2015/0161671 A1 | 6/2015 | Watkeys |
| 2015/0351075 A1 | 12/2015 | Korver et al. |
| 2015/0379582 A1 | 12/2015 | Jain et al. |
| 2016/0034588 A1 | 2/2016 | Hyatt et al. |
| 2016/0034834 A1 | 2/2016 | Snell et al. |
| 2016/0048698 A1 | 2/2016 | Sahu et al. |
| 2016/0198322 A1 | 7/2016 | Pitis |
| 2016/0267597 A1 | 9/2016 | Johansen et al. |
| 2016/0274744 A1 | 9/2016 | Neumann et al. |
| 2016/0275436 A1 | 9/2016 | Kurjanowicz et al. |
| 2016/0353237 A1 | 12/2016 | Shepherd et al. |
| 2016/0353386 A1 | 12/2016 | Sasidharan et al. |
| 2016/0379107 A1 | 12/2016 | Li et al. |
| 2017/0011398 A1* | 1/2017 | Narasimhan ......... G06Q 20/405 |
| 2017/0013440 A1 | 1/2017 | Ostling |
| 2017/0078861 A1 | 3/2017 | McNamee et al. |
| 2017/0236131 A1 | 8/2017 | Nathenson et al. |
| 2018/0018158 A1 | 1/2018 | Kalke et al. |
| 2018/0063018 A1 | 3/2018 | Bosch et al. |
| 2018/0225754 A1* | 8/2018 | Del Vecchio ......... G06Q 40/02 |

FOREIGN PATENT DOCUMENTS

| | | |
|---|---|---|
| CA | 2634626 A1 | 1/2010 |
| CN | 103677488 A | 3/2014 |
| WO | 2004023451 A1 | 3/2004 |
| WO | 2006107799 A1 | 10/2006 |
| WO | 2007014201 A2 | 2/2007 |
| WO | 2008072255 A2 | 6/2008 |
| WO | 2008076997 A1 | 6/2008 |
| WO | 2011068791 A1 | 6/2011 |
| WO | 2014153128 A1 | 9/2014 |
| WO | 2014157891 A1 | 10/2014 |
| WO | 2014200692 A1 | 12/2014 |
| WO | 2010450059 | 8/2017 |

OTHER PUBLICATIONS

Merriam Webster's Collegiate Dictionary, 10th Edition, Merriam-Webster, Incorporated, Springfield, MA, © 2000, p. 47.

* cited by examiner

SYSTEM FOR GENERATING USER EXPERIENCE FOR IMPROVING EFFICIENCIES IN COMPUTING NETWORK FUNCTIONALITY BY SPECIALIZING AND MINIMIZING ICON AND ALERT USAGE

BACKGROUND

The invention relates generally to a system that transmits alerts to users in a computing network where the alerts may include icons and other information. The type of alert transmitted is related to an associated alert condition where the alert may be related to user experience. The alert including the icon is selected for specialized purposes to more efficiently transmit alerts to the user and to generate user responses.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

In some embodiments an entity system comprises a network communication interface and a memory device storing an alert application. A processing device is operatively coupled to the memory device and is configured to execute computer-readable program code to: transmit alerts to a user device in response to alert conditions; monitor responses to the alert from the user device; and alter the visual appearance of the alerts at the user device based on the results of monitoring the responses.

The processing device may be configured to execute computer-readable program code to select from at least two different types of alerts. The two different types of alerts may comprise different icons having different visual appearances. The two different types of alerts may be associated with different alert conditions. The two different types of alerts may be based on the responsiveness of the user device. The two different types of alerts may be based on the urgency of the alert conditions. The entity system may be a financial entity system and the alert conditions relate to a user account information.

In some embodiments an entity system comprises a network communication interface and a memory device storing an alert application. A processing device is operatively coupled to the memory device and is configured to execute computer-readable program code to: transmit alerts to a plurality of user devices in response to alert conditions; monitor responses to the alert from the user devices; and alter the visual appearance of the alerts at the user devices based on the results of monitoring the responses.

The processing device may be configured to execute computer-readable program code to select from at least two different types of alerts based on the aggregate data from the plurality of user devices. The two different types of alerts may be matched to different alert conditions. The two different types of alerts may comprise different icons having different visual appearances. The two different types of alerts may be based on the aggregate responsiveness of the plurality of user devices. The two different types of alerts are based on the urgency of the alert conditions.

In some embodiments an entity system comprises a network communication interface and a memory device storing an alert application. A processing device is operatively coupled to the memory device, wherein the processing device is configured to execute computer-readable program code to: monitor a user account for a first alert condition and a second alert condition; determine to transmit a first alert for the first alert condition and a second alert to a second alert condition to a user device in response to monitoring the user account; and transmit a first type of alert for the first alert condition and a second type of alert for the second condition where the first alert and the second alert are different in visual appearance from one another.

The first alert and the second alert may be different in at least one of color and size. The first alert and the second alert may comprise different icons having different visual appearances. The network communication interface may transmit a message to the user device such that the first alert and the second alert are displayed on the user device without being displayed in-line with associated transaction information. The network communication interface may receive a message from the user device such that the network communication interface transmits a message to the user device disabling the first alert and the second alert such that the first alert and the second alert are not displayed. The first alert and the second alert may comprise different icons and alphanumeric characters having different visual appearances. The first alert and the second alert may be associated with two different alert conditions and the first alert and the second alert may be based on the responsiveness of the user device the urgency of the alert conditions.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
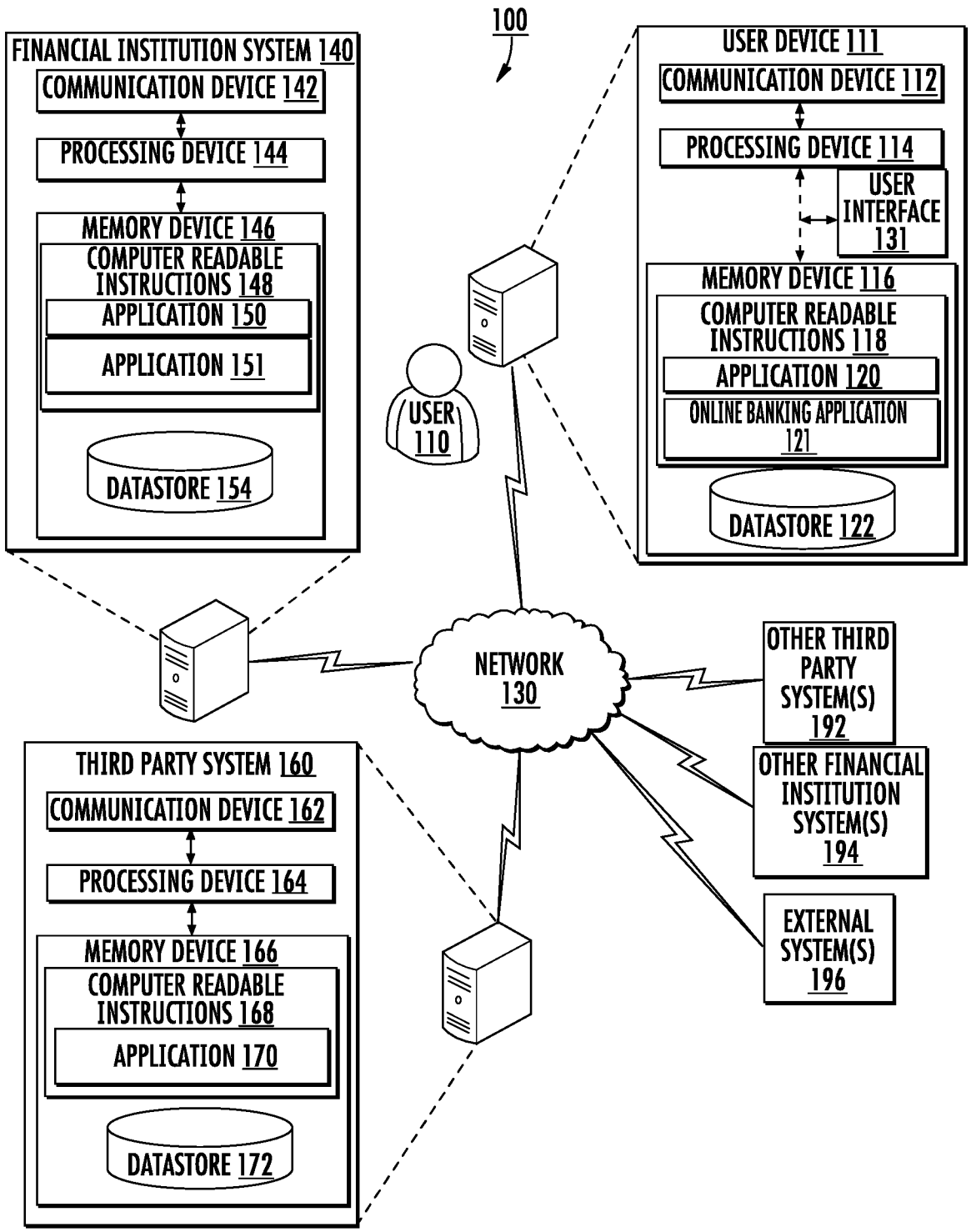
Figure 2A:
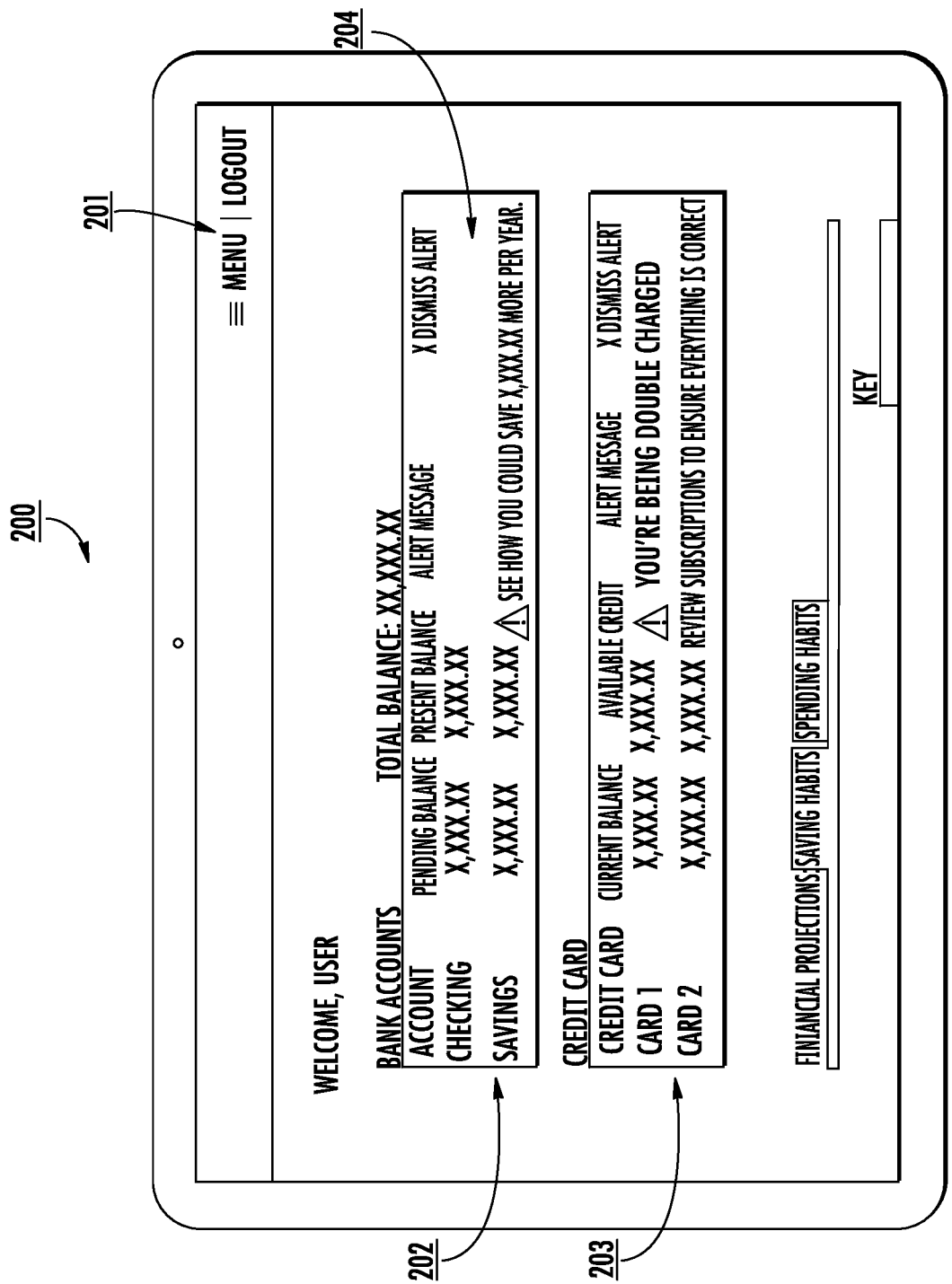
Figure 2B:
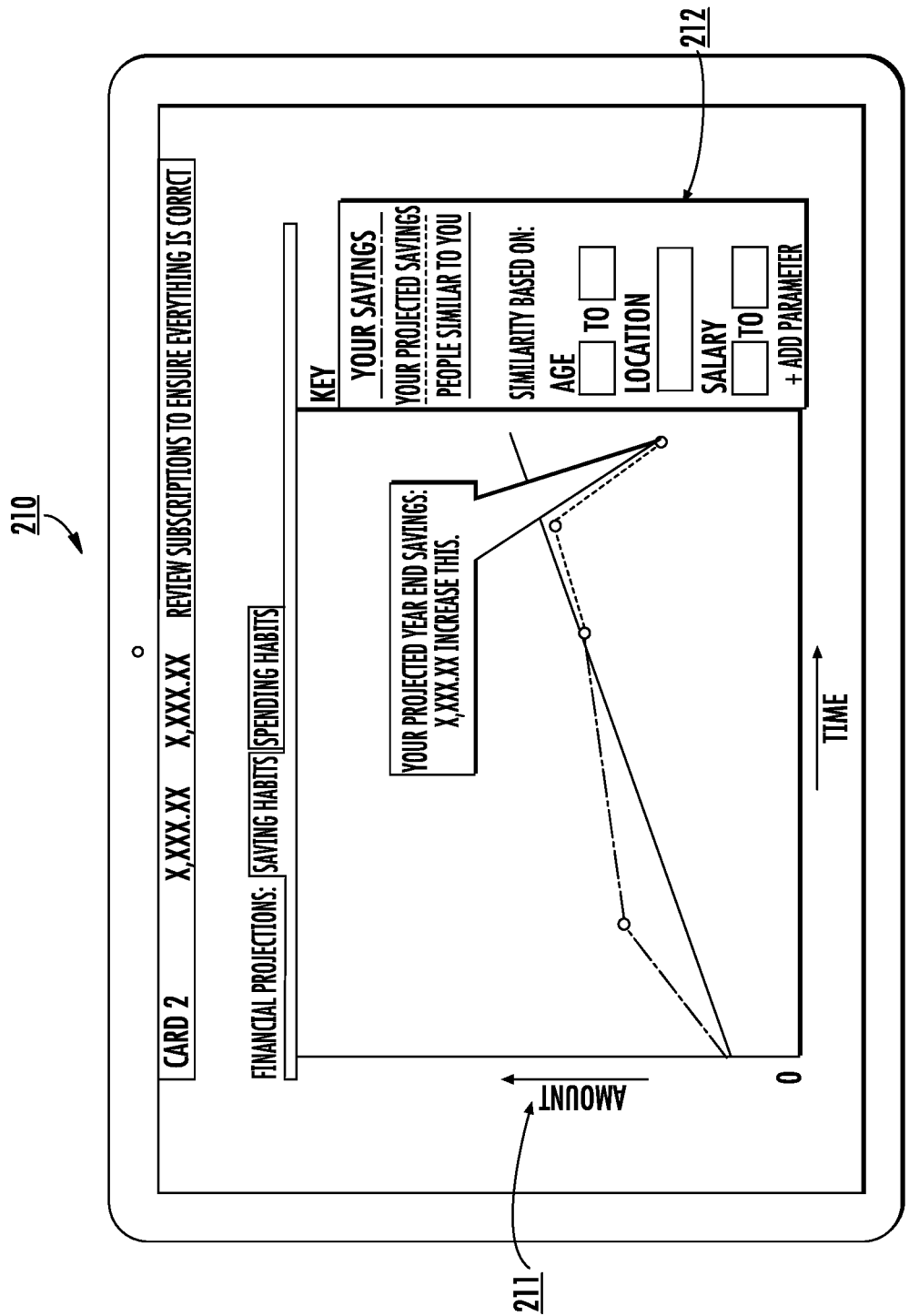
Figure 2C:
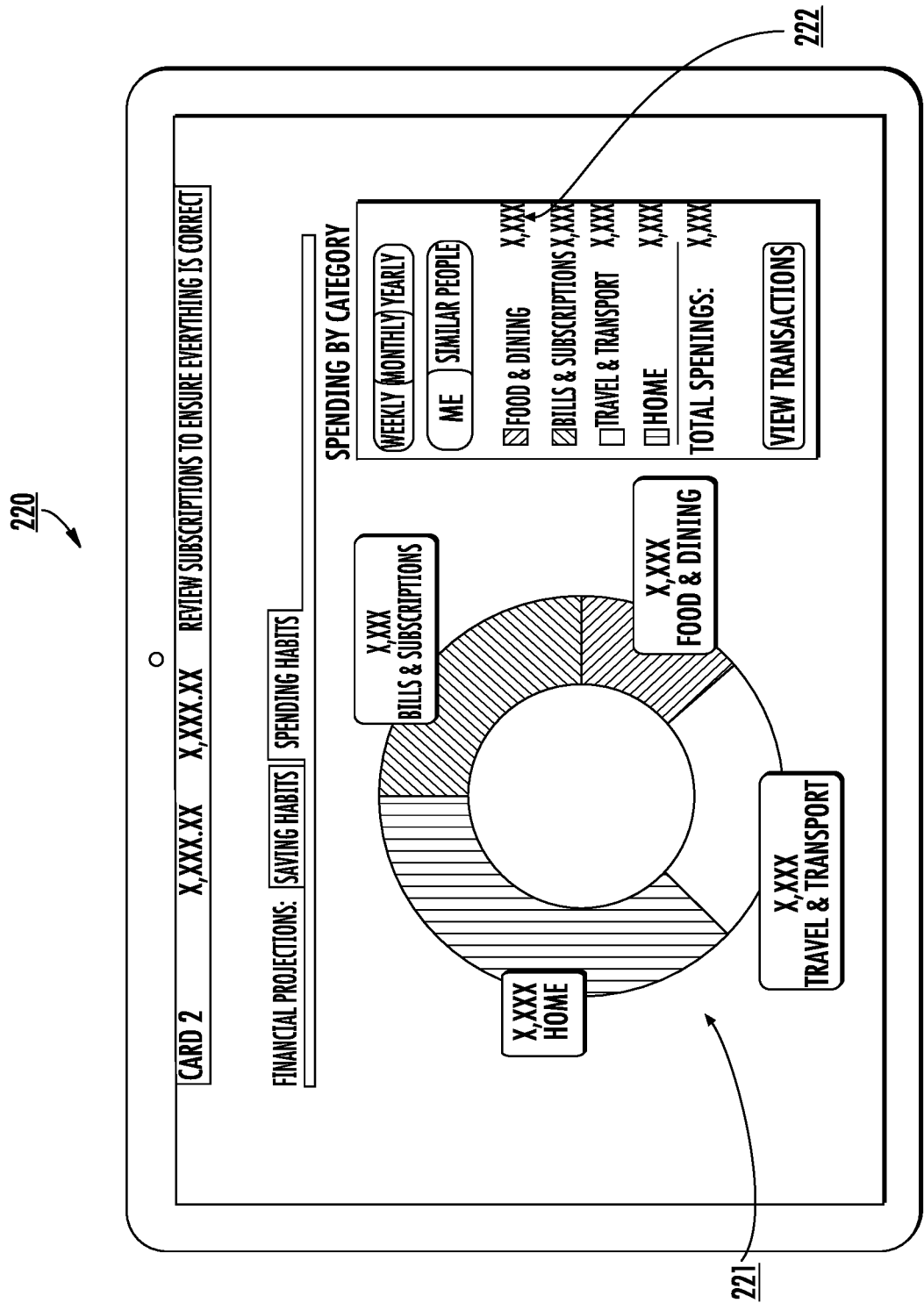
Figure 2D:
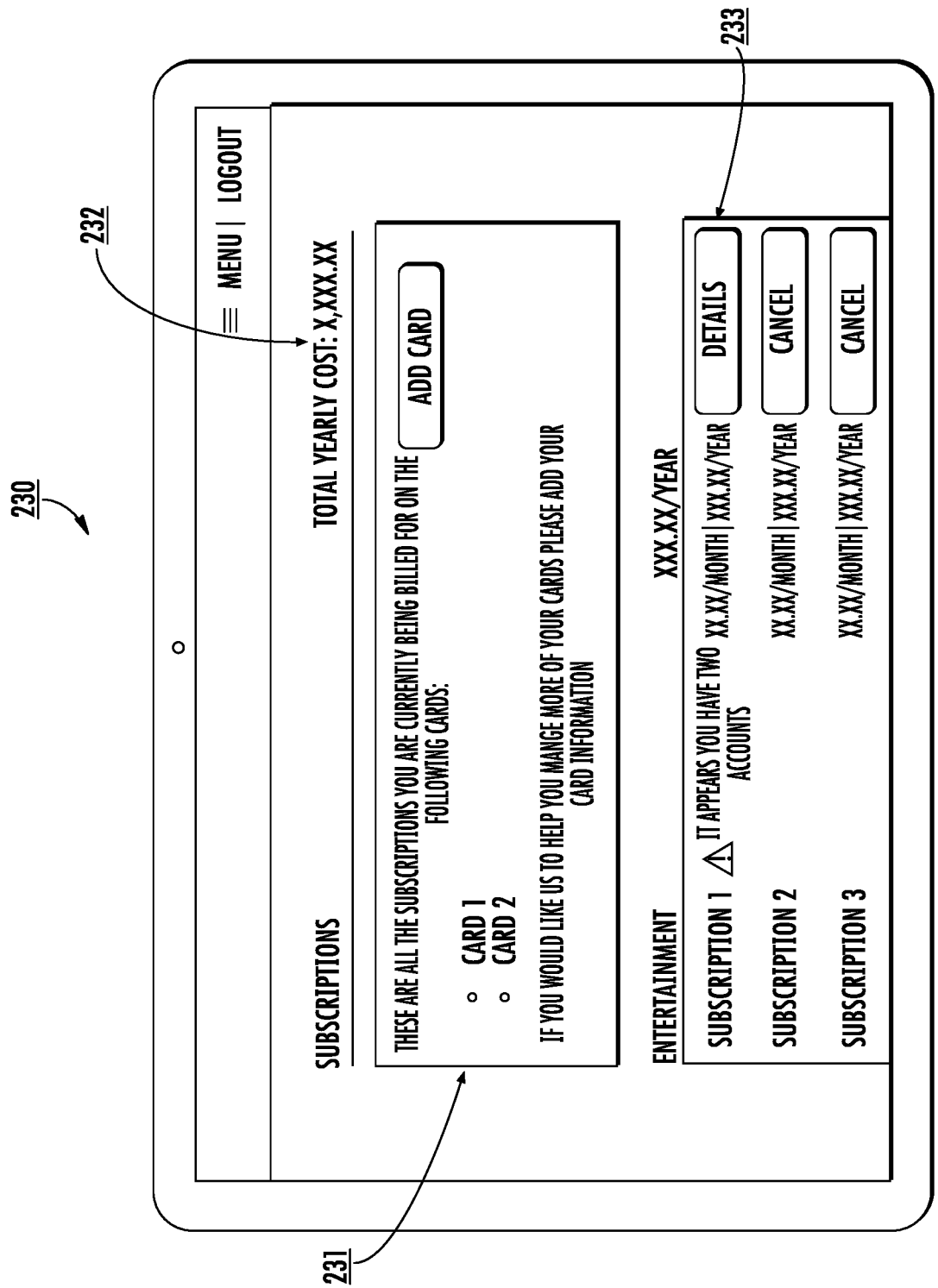
Figure 3:
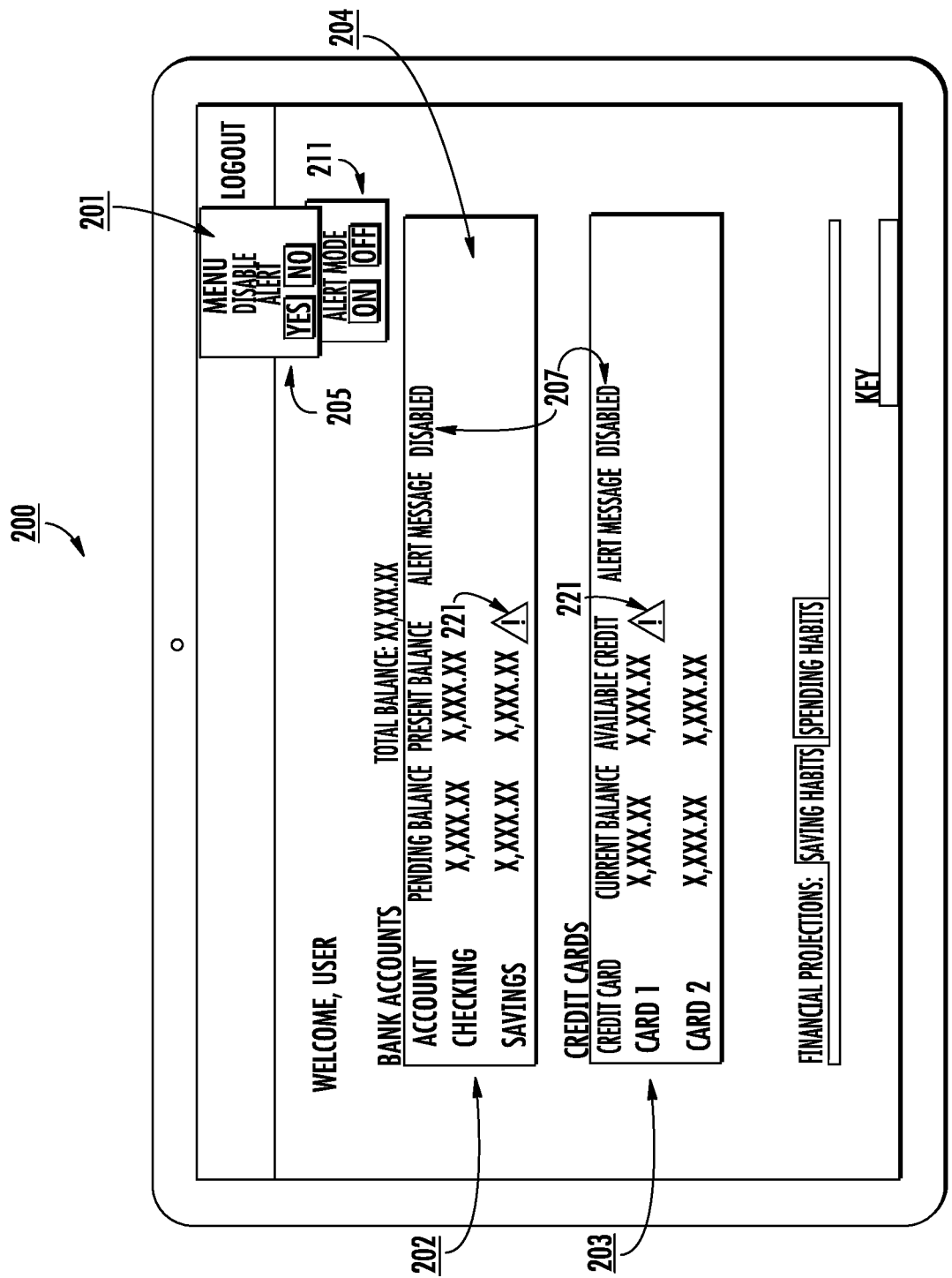

Having thus described embodiments of the invention in general terms, reference will now be made to the accompanying drawings, wherein:

FIG. 1 provides a system environment in which embodiments of the invention operate, in accordance with one embodiment of the present invention;

FIG. 2A illustrates a graphical representation of a portion of a banking application user interface, in accordance with some embodiments of the invention;

FIG. 2B illustrates a graphical representation of a portion of a banking application user interface for monitoring asset savings, in accordance with some embodiments of the invention;

FIG. 2C illustrates a graphical representation of a portion of a banking application user interface for monitoring asset spending, in accordance with some embodiments of the invention;

FIG. 2D illustrates a graphical representation of a portion of a banking application user interface for monitoring subscriptions, in accordance with some embodiments of the invention;

FIG. 3 is a graphical representation of a portion of a banking application user interface similar to FIG. 2A showing a disable alert mode.

Figure 4:
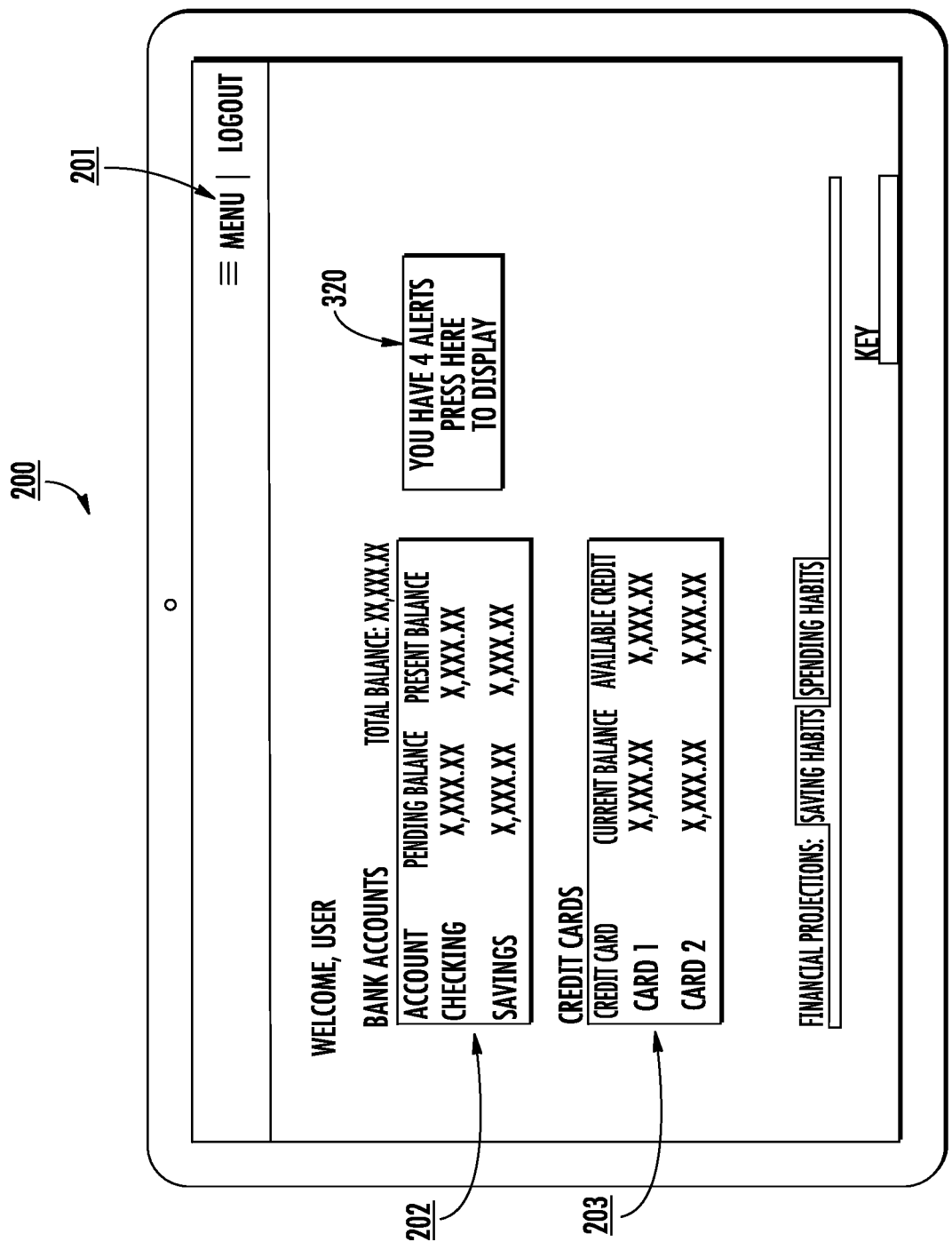

FIG. 4 is a graphical representation of a portion of a banking application user interface similar to FIG. 2A showing an alert mode.

Figure 5:
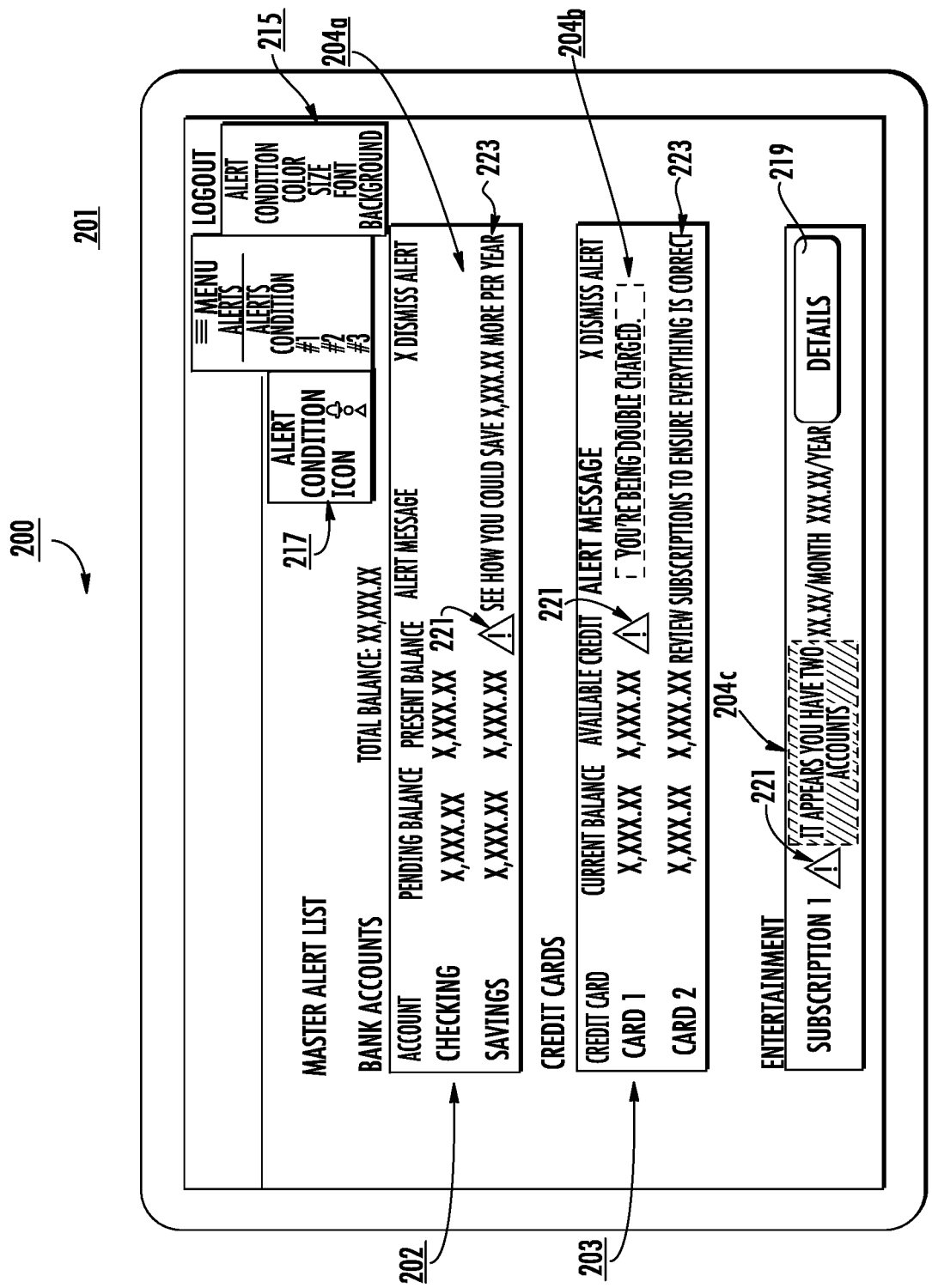

FIG. 5 is a graphical representation of a portion of a banking application user interface similar to FIG. 2A showing a master alert list in alert mode.

Figure 6:
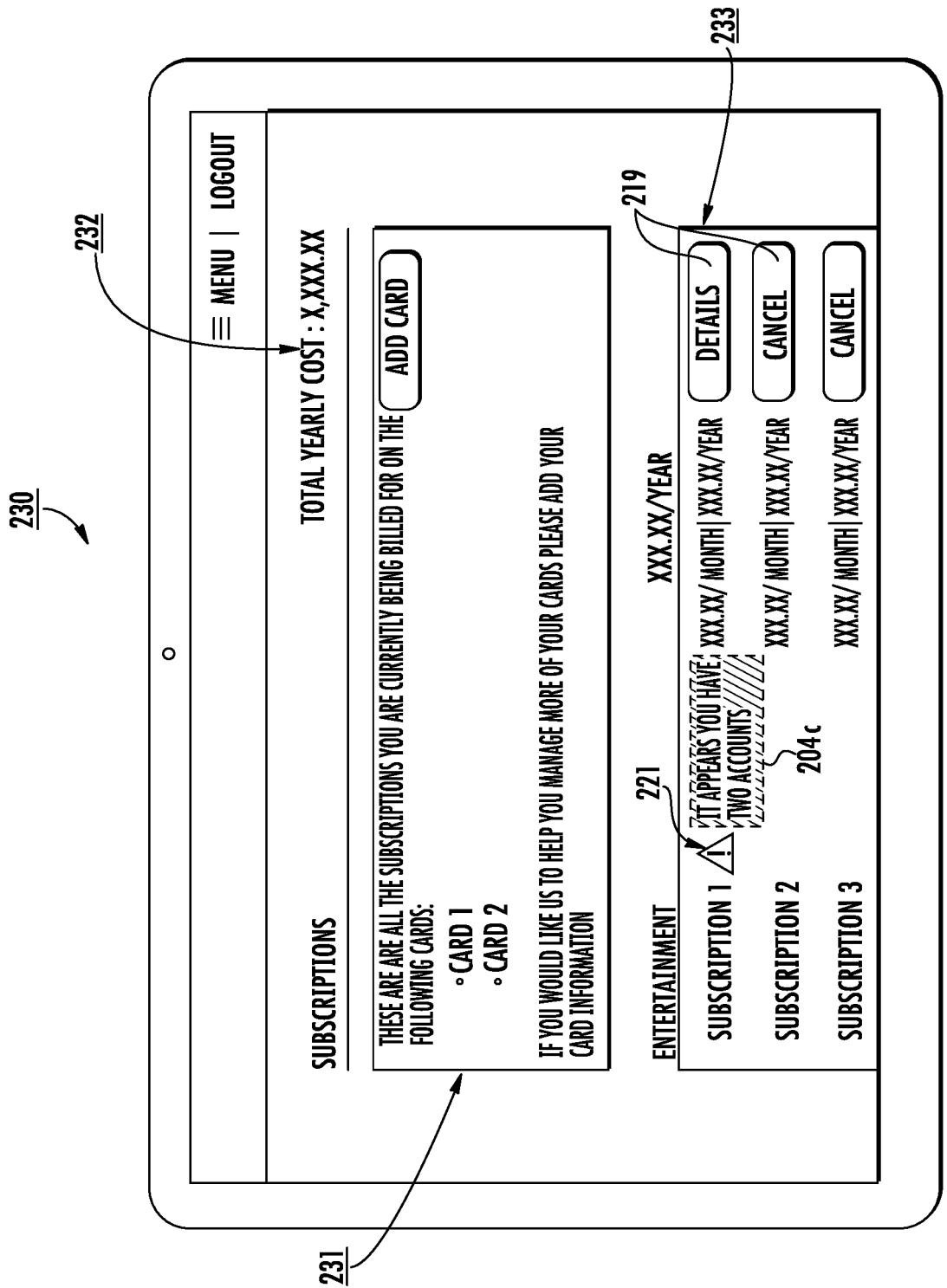

FIG. 6 is a graphical representation of a portion of a banking application user interface similar to FIG. 2D showing different types of alert messages.

Figure 7:
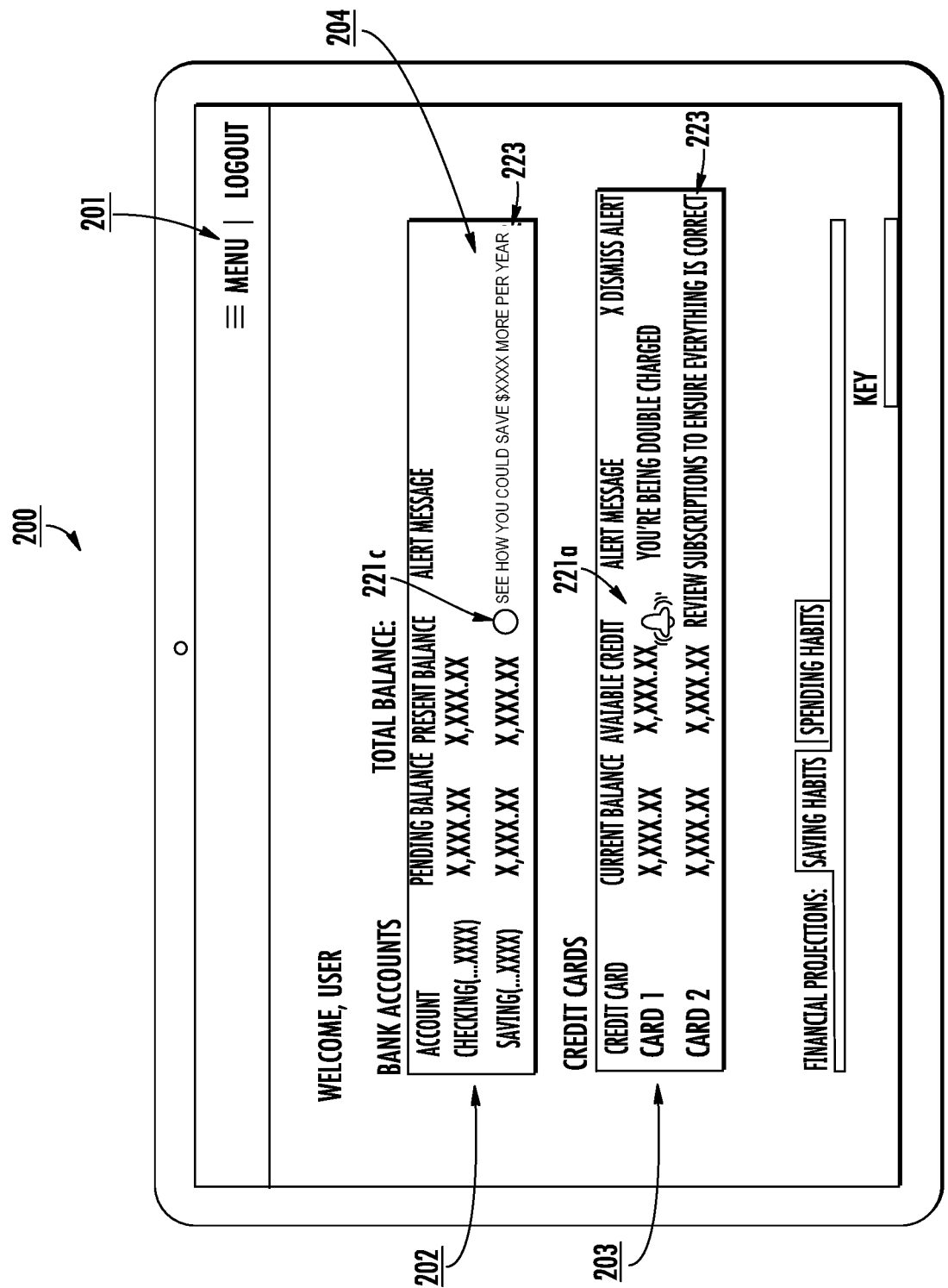

FIG. 7 is a graphical representation of a portion of a banking application user interface similar to FIG. 2A showing different types of alert icons.

Figure 8:
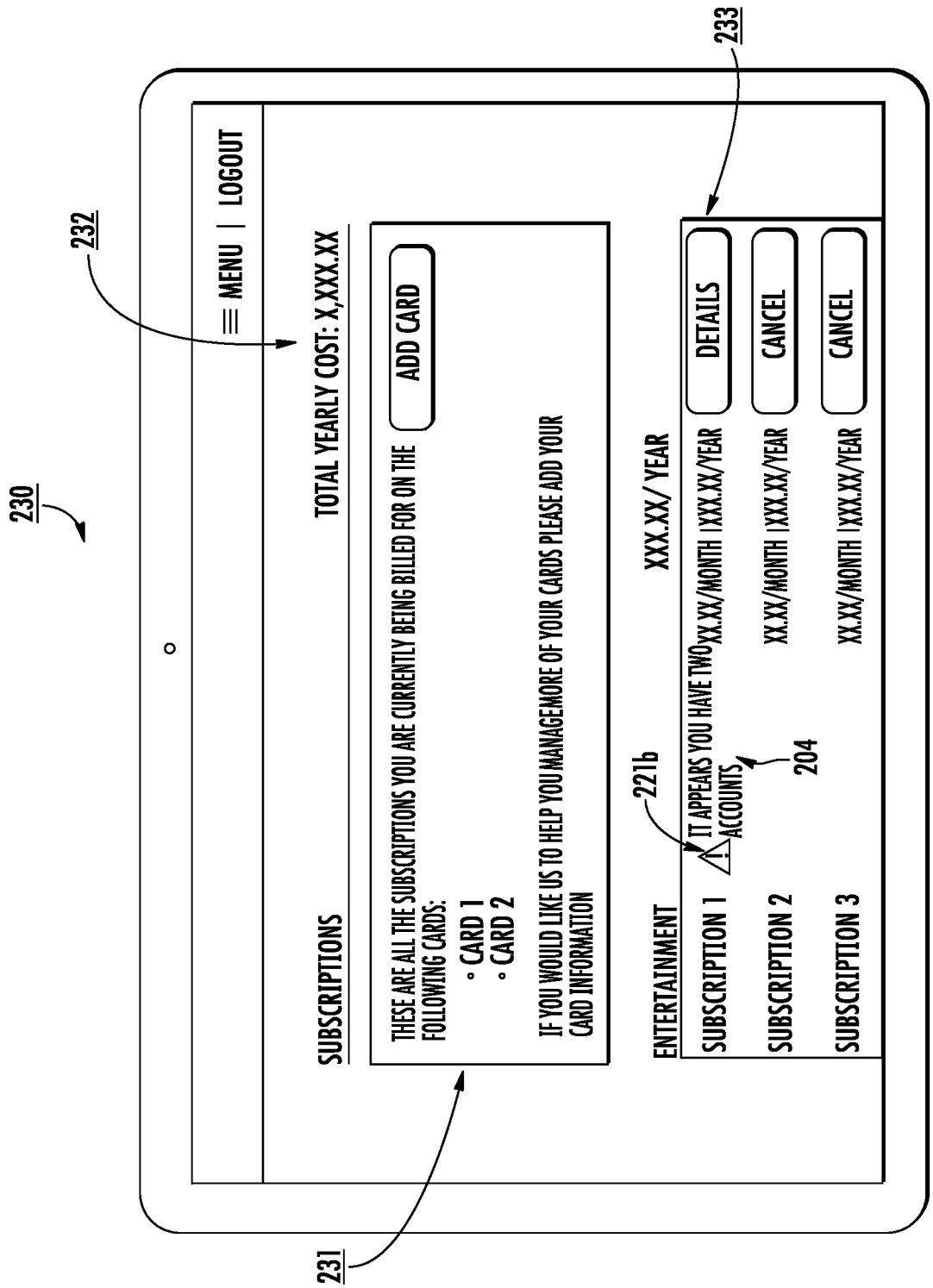

FIG. 8 is a graphical representation of a portion of a banking application user interface similar to FIG. 2D showing different types of alert icons.

Figure 9:
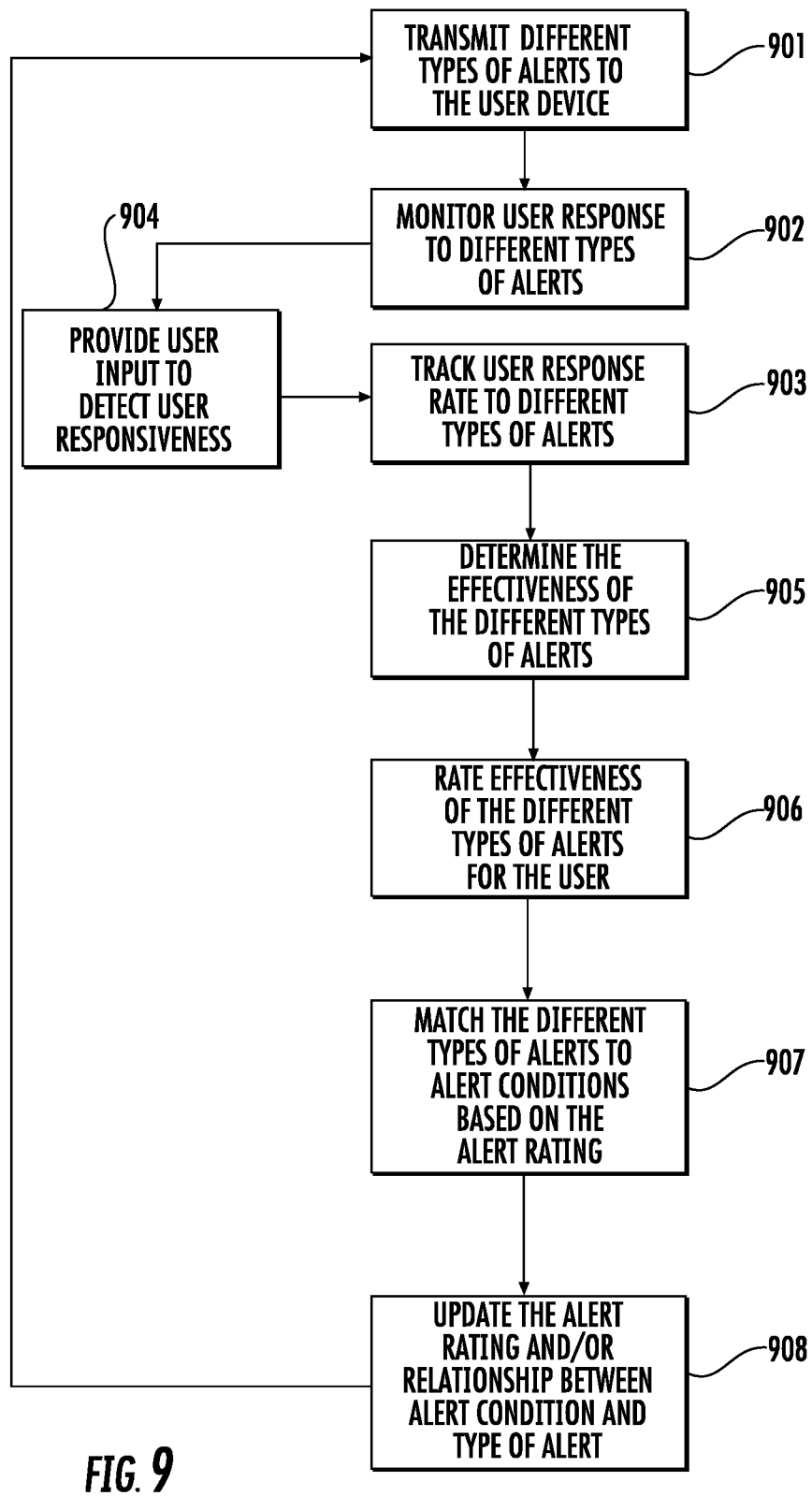

FIG. 9 is a flow chart illustrating an embodiment of a method of operating the system of the invention.

Figure 10:
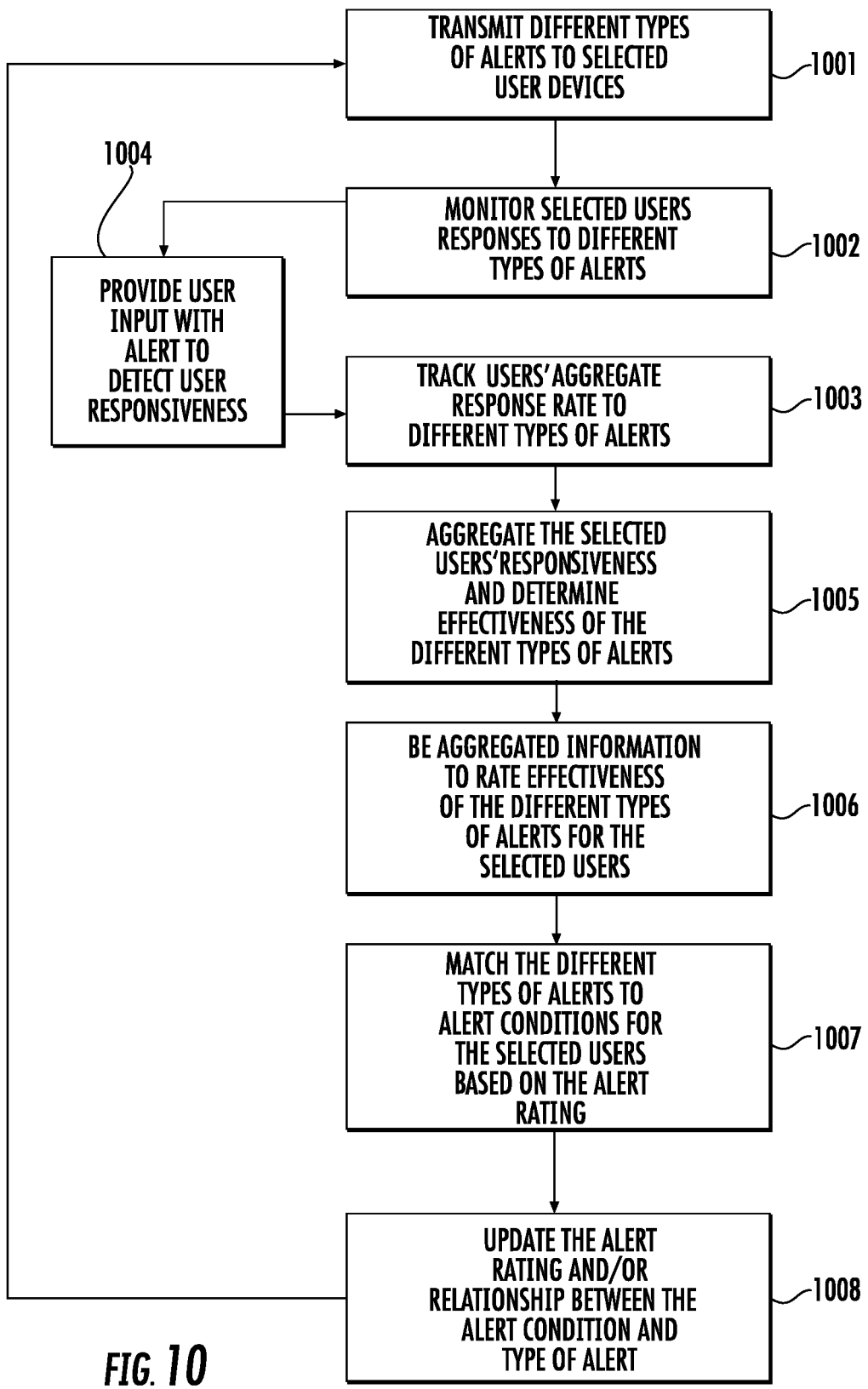

FIG. 10 is a flow chart illustrating another embodiment of a method of operating the system of the invention.

DETAILED DESCRIPTION OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

An "account" is the relationship that a user has with an entity, such as a financial institution. Examples of accounts include a deposit account, such as a transactional account (e.g., a banking account), a savings account, an investment account, a money market account, a time deposit, a demand deposit, a pre-paid account, a credit account, a non-monetary user profile that includes information associated with the user, or the like. The account is associated with and/or maintained by the entity. "Assets" include accounts of the user and/or other property owned by the user. The assets may be associated with accounts or may be property that is not associated with a specific account. Examples of assets associated with accounts may be accounts that have cash or cash equivalents, or accounts that are funded with or contain property, such as safety despots box account that jewelry, a trust account that is funded with property, or the like. Examples of assets that may not be associated with accounts may be antiques in a user's home, jewelry in a user's home, or the like. "Authentication information" is any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. An "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. A "financial event" or "life event" may be any immediate or future event that causes a change in a user's financial status. A financial event may be a charge, a transaction, and exchange, or the like that may cause the user to lose or gain money and/or assets. Examples of financial events or life events include a medical expense, buying a house, college tuition, rent, moving to a new city, receiving a raise or bonus in pay and the like. To "monitor" is to watch, observe, or check something for a special purpose over a period of time. The "monitoring" may occur periodically over the period of time, or the monitoring may occur continuously over the period of time. In some embodiments, a system may actively monitor a database, wherein the system reaches out to the database and watches, observes, or checks the database for changes, updates, and the like. In other embodiments, a system may passively monitor a database, wherein the database provides information to the system and the system then watches, observes, or checks the provided information. A "transaction" refers to any communication between a user and the financial institution or other entity monitoring the user's activities. A transaction may also refer to any communication between a user and a third party. For example, a transaction may refer to a purchase of goods or services, a return of goods or services, a payment transaction, a credit transaction, or other interaction involving a user's account. In the context of a financial institution or third party, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, digital items and the like); making payments to creditors (e.g., paying monthly bills; paying federal, state, and/or local taxes; and the like); sending remittances; loading money onto stored value cards (SVCs) and/or prepaid cards; donating to charities; and/or the like. A "user" may be a financial institution customer (e.g., an account holder or a person who have an account (e.g., banking account, credit account, or the like)). In one aspect, a user may be any financial institution customer involved managing spending and accounts with the financial institution or any other affiliate entities associated with the financial institution. In some embodiments, the user may be an individual who may be interested in opening an account with the financial institution. In some embodiments, a "user" may be a financial institution employee (e.g., an underwriter, a project manager, an IT specialist, a manager, an administrator, an internal operations analyst, bank teller or the like) capable of operating the system described herein. For purposes of this invention, the term "user" and "customer" may be used interchangeably. A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

Referring now to FIG. 1, the figure illustrates a processing system environment 100, in accordance with some embodiments of the invention. The environment 100 includes a user device 111 associated or used with authorization of a user 110 (e.g., an account holder, a mobile application user, a bank customer, and the like), a third party system 160, and a financial institution system 140. In some embodiments, the third party system 160 corresponds to a third party financial institution. The environment 100 further includes one or more third party systems 192 (e.g., a partner, agent, or contractor associated with a financial institution), one or more other financial institution systems 194 (e.g., a credit bureau, third party banks, and so forth), and one or more external systems 196.

The systems and devices communicate with one another over the network 130 and perform one or more of the various steps and/or methods according to embodiments of the disclosure discussed herein. The network 130 may include a local area network (LAN), a wide area network (WAN), and/or a global area network (GAN). The network 130 may provide for wireline, wireless, or a combination of wireline and wireless communication between devices in the network. In one embodiment, the network 130 includes the Internet.

The user device 111, the third party system 160, and the financial institution system 140 each includes a computer system, server, multiple computer systems and/or servers or the like. The financial institution system 140, in the embodiments shown has a communication device 142 communicably coupled with a processing device 144, which is also communicably coupled with a memory device 146. The processing device 144 is configured to control the communication device 142 such that the financial institution system 140 communicates across the network 130 with one or more other systems. The processing device 144 is also configured to access the memory device 146 in order to read the computer readable instructions 148, which in some embodiments includes one or more applications such as applications 150 and 151. At least one of the applications 150, 151 may be an alert application that includes the instructions for carrying out the invention as described herein. The memory device 146 also includes a datastore 154 or database for storing pieces of data that can be accessed by the processing device 144.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 114, 144, or 164 may further include functionality to operate one or more software programs based on computer-executable program code thereof, which may be stored in a memory. As the phrase is used herein, a processing device 114, 144, or 164 may be "configured to" perform a certain function in a variety of ways, including, for example, by having one or more general-purpose circuits perform the function by executing particular computer-executable program code embodied in computer-readable medium, and/or by having one or more application-specific circuits perform the function.

Furthermore, as used herein, a "memory device" generally refers to a device or combination of devices that store one or more forms of computer-readable media and/or computer-executable program code/instructions. Computer-readable media is defined in greater detail below. For example, in one embodiment, the memory device 146 includes any computer memory that provides an actual or virtual space to temporarily or permanently store data and/or commands provided to the processing device 144 when it carries out its functions described herein.

The user device 111 includes a communication device 112 communicably coupled with a processing device 114, which is also communicably coupled with a memory device 116. The processing device 114 is configured to control the communication device 112 such that the user device 111 communicates across the network 130 with one or more other systems. The processing device 114 is also configured to access the memory device 116 in order to read the computer readable instructions 118, which in some embodiments includes application 120 and online banking application 121. The memory device 116 also includes a datastore 122 or database for storing pieces of data that can be accessed by the processing device 114. The user device 111 may be a mobile device of the user 110, a bank teller device, a third party device, an automated teller machine, a video teller machine, or another device capable of capturing a check image.

The user device 111 further includes a user interface 131 that allows input from the user to the user device and output from the user device to be displayed to the user. As used herein, a "user interface" 130 generally includes a plurality of interface devices and/or software that allow a customer to input commands and data to direct the processing device to execute instructions. For example, the user interface 131 presented in FIG. 1 may include a graphical user interface (GUI) or an interface to input computer-executable instructions that direct the processing device 114 to carry out specific functions. The user interface 131 employs certain input and output devices. These input and output devices may include a display, mouse, keyboard, button, touchpad, touch screen, microphone, speaker, LED, light, joystick, switch, buzzer, bell, and/or other user input/output device for communicating with one or more users. The banking application interfaces shown in FIGS. 2A through 8 may be displayed on user interface 131 such as on a touch screen display.

The third party system 160 includes a communication device 162 communicably coupled with a processing device 164, which is also communicably coupled with a memory device 166. The processing device 164 is configured to control the communication device 162 such that the third party system 160 communicates across the network 130 with one or more other systems. The processing device 164 is also configured to access the memory device 166 in order to read the computer readable instructions 168, which in some embodiments includes an application 170. The memory device 166 also includes a datastore 172 or database for storing pieces of data that can be accessed by the processing device 164.

In some embodiments, the application 120, the online banking application 121, and the application 170 interact with the application 150 or 151 to receive or provide financial data, analyze financial record data, and implement business strategies, transactions, and processes. The applications 150 and 151 may be a suite of applications for performing these functions.

In some embodiments, the application 120, the online banking application 121, and the application 170 interact with the applications 150 and 151 to utilize metadata to determine decisions for processing.

The applications 120, 121, 150, 151, and 170 are for instructing the processing devices 114, 144 and 164 to perform various steps of the methods discussed herein, and/or other steps and/or similar steps. In various embodiments, one or more of the applications 120, 121, 150, 151, and 170 are included in the computer readable instructions stored in a memory device of one or more systems or devices other than the systems 160 and 140 and the user device 111. For example, in some embodiments, the application 120 is stored and configured for being accessed by a processing device of one or more third party systems 192 connected to the network 130. In various embodiments, the applications 120, 121, 150, 151, and 170 stored and executed by different systems/devices are different. In some embodiments, the applications 120, 121, 150, 151, and 170 stored and executed by different systems may be similar and may be configured to communicate with one another, and in some embodiments, the applications 120, 121, 150, 151, and 170 may be considered to be working together as a singular application despite being stored and executed on different systems.

In various embodiments, one of the systems discussed above, such as the financial institution system 140, is more than one system and the various components of the system are not collocated, and in various embodiments, there are multiple components performing the functions indicated herein as a single device. For example, in one embodiment, multiple processing devices perform the functions of the processing device 144 of the financial institution system 140 described herein. In various embodiments, the financial institution system 140 includes one or more of the external systems 196 and/or any other system or component used in conjunction with or to perform any of the method steps discussed herein. For example, the financial institution system 140 may include a financial institution system, a credit agency system, and the like.

In various embodiments, the financial institution system 140, the third party system 160, and the user device 111 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of one or more of the method discussed herein, or other methods, processes or steps discussed herein or not discussed herein.

Referring now to FIG. 2A, the figure illustrates a graphical representation of a portion of a banking application user interface 200, in accordance with some embodiments of the invention. In some embodiments, the banking application is the online banking application 121. The user interface allows the user to input information, such as commands or data, into a device, and allows the device to output information to the user. As illustrated in FIG. 2A, in some embodiments, the application presents the user with means for navigating the interface by providing a menu 201. The menu 201 may be a drop-down menu which provides the user with additional interactive selections for navigation within the application. Furthermore, the menu provides a logout option which allows the user to exit the application. Upon logging out or initially launching the application, the user may be prompted by the application to provide authentication information to log in. In some embodiments, the application may provide the user, via the user interface, with information related to one or more accounts associated with the user such as bank accounts 202, credit card accounts 203, and the like. The application my additionally provide alerts 204a, 204b to the user such as alerts regarding savings goals, budgets, offers for goods or services and the like. In some embodiments, the alerts may be in-line with the account information associated with the user or even be presented along with individual transactions. In some embodiments, the user may optionally toggle the appearance of alerts so that they may or may not be displayed via the user interface.

Referring now to FIG. 2B, the figure illustrates a graphical representation of a portion of a banking application user interface for monitoring asset savings 210, in accordance with some embodiments of the invention. As illustrated by element 211, the application presents to the user, via the user interface, a projection of asset savings by monitoring financial information associated with the one or more user accounts. In some embodiments, the projection is presented to the user via a graph, chart, or the like, wherein the user may modify the scale of time of the record to reflect weekly, monthly, yearly spending or the like. Additionally, the application may provide the user with one or more actionable alerts to allow the user to modify his or her saving habits. Furthermore, the application may present asset saving habits and projections for other users determined to be similar to the user. In some embodiments, the application provides one or more interactive fields 212 for the input of parameters used determine the other similar users.

Referring now to FIG. 2C, the figure illustrates a graphical representation of a portion of a banking application user interface for monitoring asset spending 220, in accordance with some embodiments of the invention. As illustrated by element 221, the application presents to the user, via the user interface, a record of asset spending by monitoring financial information associated with the one or more user accounts. In some embodiments, the record is presented to the user via a graph, chart, or the like, wherein the user may modify the scale of time of the record to reflect weekly, monthly, yearly spending or the like. Additionally, the application may provide the user with one or more actionable alerts to allow the user to modify his or her spending habits. Furthermore, the application may present asset spending habits and projections for other users determined to be similar to the user. In some embodiments, the application provides one or more interactive fields 222 for the input of parameters used determine the other similar users, such as age, location, salary, and the like.

Referring now to FIG. 2D, the figure illustrates a graphical representation of a portion of a banking application user interface for monitoring subscriptions 230, in accordance with some embodiments of the invention. As illustrated by element 231, the application user interface displays credit cards, debit cards, payment accounts, and the like used for the payment of one or more subscriptions associated with the user. Additionally, the user is presented with a total cost of the one or more subscriptions associated with the user 232. As illustrated by element 233, the user interface may present the one or more subscriptions to the user and provide actionable alerts 204c to the user such as alerts that identify duplicate subscriptions associated with the user. The application may present additional details associated with the one or more subscriptions such as cost, sign-up date, renewal data, and the like.

Alerts 204a, 204b, 204c are provided to bring the user's attention to special circumstances or situations related to the user's accounts, transactions or the like (referred to herein as "alert conditions"). The illustrated examples of alert conditions include double charges, duplicate subscriptions, and financial performance metrics. The alert conditions may include any activity or situation related to a user account or transaction including, but not limited to, direct deposit notifications, due dates of payments, balance information, credit card budget limits, security alerts and the like. The alerts are transmitted from the financial institution system 140 to the user device 111 such that the alerts may be displayed to the user by the user interface 131. In some embodiments the alerts are provided as a part of the transaction log as shown in FIG. 2A or as part of a subscription log as shown in FIG. 2D. The alerts may be provided alongside account and transaction information other than the transaction log and subscription log as shown in the figures. As shown in FIGS. 2A and 2D the alerts 204a, 204b, 204c are provided in-line with the transactions where the alerts 204a, 204b, 204c are presented along with information relating to the underlying transactions. The alerts may be provided automatically with each related transaction such that the user obtains the alert and the transaction information related to the alert on the same page of the display on user device 111. In operation of the system of the invention, the financial institution system monitors the user's transactions, transaction history, financial plan and other user related information with the financial institution and, based on rules established by the financial institution system or by rules established by the financial institution system in conjunction with input from the user, transmits alerts to the user device 111 when an alert condition is met.

In some embodiments the in-line alerts may provide too much information to the user in one display such that the effectiveness of the alerts may be lost among the other information presented to the user such as the transaction information in a transaction log or the subscription information in a subscription log. In one embodiment the user device 111 may be provided with a user input 205 (FIG. 3) that enables and/or disables the display of the alerts 204. In this and in other embodiments described herein term user input is used to refer to any user input device for controlling the user device 111. The user input 205 may be a soft button or soft key such as commonly found on a touch screen, a soft button that may be programmed to control a specific function, a hard button, a mouse, a keyboard or other user input device. The user input 205 may be provided as part of a drop down menu 201 as shown in FIG. 3. The user input such as a graphical switch or soft button may be provided at any location in the user application. The alert system may automatically operate in alert mode such that the default operation is to transmit the alerts from the financial institution system to the user device 111 as in-line alerts as shown, for example, in FIG. 2A. When the user disables the alert function, the alerts are not displayed on the user device 111 as shown in FIG. 3. The user device may display an alert message disabled indicator 207 to inform the user that the alerts have been disabled. In one embodiment, when the disable alert user input 205 is selected, the user device 111 transmits a disable alert message that is received by the financial institution system 140. In response to the disable alert message the financial institution system 140 may not transmit the alert information to the user device 111 such that the information related to the alert conditions is maintained in the financial institution system 140 but is not transmitted to the user device 111. In other embodiments when the user presses the disable alert input 205, the financial institution system 140 may transmit the alert information to the user device but the user device 111 disables the alert display functionality in the application 120 on the user device 111 such that the alert information is not displayed on user interface 131. While the alert information is not displayed when the user elects to disable alert function, the alert conditions may be continued to be monitored by the financial institution system 140 and the alert conditions may be logged and stored in memory device 146 of the financial institution system 140 and/or in the memory device 116 of user device 111. In some embodiments, the user may be able to disable some, but not all, of the alerts generated by the financial institution system 140. The financial institution system 140 may require certain critical alerts to be sent to the user even if the alert function is disabled. For example, alerts relating to security may be transmitted to and displayed at the user device 111 even where the alert function is disabled by the user at the user device 111.

In some embodiments, the system may operate in an "alert mode" where only the alerts are displayed to the user on user device 111 such that the other transactions in the log are hidden. The menu may provide for the "alert mode" by a user input 211 (FIG. 3) in the menu 201 or elsewhere on the user interface. When the alert mode is selected, the alerts may be consolidated in a separate page rather than being displayed in-line with the associated transaction. In one embodiment, when alert mode is selected, a master alert user input 320 is provided on the transaction pages of the user device as shown in FIG. 4. As shown in FIG. 4, the master alert user input 320 may indicate to the customer "you have 4 alerts, press here to display" where the user may select master alert user input 320 to display the master alert list 324. Referring to FIG. 5, the master alert list 324 displays all of the alerts transmitted to the user device 111 from the financial institution system 140 in a single list rather than being displayed in-line with all of the transactions in the transaction log. The master alert list 324 may contain only those items for which an alert is sent. This list may not include transactions, accounts or other financial data that do not include an associated alert such that the list is limited to entries with corresponding alerts. The master alert list 324 may be displayed as a separate list on a separate page or a pop up window as shown in FIG. 5. In this manner the alert mode may be used to consolidate all of the alerts from the transaction log in order to minimize confusion for the user when reviewing the display of the user device 111. The master alert list 324 may provide only the alerts without any additional transaction information being displayed or the master alert list may display the alerts together with the related transaction information. In this and in other embodiments the alerts may be provided as links that, when selected by the user, display information related to the alerts. In another embodiment, election of alert mode 211 automatically moves the alerts from the in-line display of FIGS. 2A and 2D to a master list arrangement as shown in FIG. 5 without the intermediate display of FIG. 4. Moreover, the display of FIG. 4 may be the default display such that the display of FIG. 4 may be used without the user having to select alert mode.

In some embodiments, the alert messages may be modified in appearance such that different alert conditions are provided with alerts having different visual appearances. In this manner the user may quickly identify the type of alert by the visual appearance of the alert message without having to read or otherwise process the substance of the alert message. In some embodiments the alert message may comprise alphanumeric text where the different appearances of the different types of messages is accomplished by varying the appearance of the text. For example, as shown in FIGS. 2A, 5 and 6 a first type of alert 204a for a first alert condition may be provided in all caps, initial caps, a first font size, a first font type, a first font color, a first background color, combinations of such variables or the like, and a second type of alert 204b for a second alert condition may be provided with no caps, a second font size, a second font type, a second font color, a second background color, combinations of such variables or the like. The differences in the visual appearance of the alert 204b is illustrated in the drawings by the dashed outline of the alert 204b as compared to alert 204a. It is to be understood that the difference may represent a difference in font size, font color, background color, capitalization, bold, italics, underlining, or other visual appearance characteristic. The alert 204a for the first type of alert condition has a different visual appearance when displayed on the user device 111 than the alert 204b for the second type of alert condition. More than two types of alert appearances may be provided such that multiple types of alerts for multiple types of alert conditions may be provided where each type of alert has a different visual appearance as shown, for example, by the third type of alert 204c represented by the shaded alert in FIGS. 5 and 6. The differences in appearance described above may be combined in different alerts such that the alerts may be visually different from one another in more than one variable. For example, the color, size and style of font may be different for a first alert condition than for a second alert condition.

In one exemplary embodiment, the difference in appearance of the displayed alerts may be based on the importance and/or urgency of the alert condition where a more urgent alert condition may be provided in a larger font and in a first more prominent color and a second less urgent alert may be displayed in a smaller font and in a second less prominent color. For example, a more urgent alert may be used for the user being charged twice for the same purchase versus a less urgent alert being used if the user is spending too much in general. The appearance of the alert may be selected based on a user's reaction to the visual appearance of the alert. For example an alert for a high urgency alert condition may be displayed in red font and in all capital letters while an alert for a medium urgency level alert condition may be displayed in initial caps and in yellow font and an alert for a low urgency alert condition may be displayed in no caps and in a green font. In this manner the user may identify and sort through the alerts by quickly scanning the visual appearances of the alerts without having to read the substance of the alerts.

In some embodiments the alert may change automatically over time based on whether or not the user acts on the alert. For example, if the user hasn't acted on the alert for a predetermined period of time the visual appearance or presentation of the alert may change. For example, if the alert is not acted upon by the user after a predetermined period of time the alert message and/or icon may increase in size, change color, change font, move up or down on the alert list or otherwise change in appearance in order to encourage the user to act on the alert. For example, if an urgent alert is sent to the user and the user doesn't act on the alert after 24 hours, the size, color and location of the alert on the user display may change to encourage the user to notice and act on the alert. For example, the alert may increase in size, change from yellow to red and move to the top of the alert list. If the alert is not acted upon after another 24 hours the visual appearance of the alert may be altered again to change background colors, change icon, to flash or the like. For less urgent alert situations the time period may be longer than for more urgent alert situations and the changes to the visual appearance of the alerts may be less drastic. In such an embodiment the alert is transmitted to the user device from the financial institution system and the financial institution system monitors communications from the user to detect action on the alert by the user. If the user does not act on the alert within the predetermined period of time, the financial institution transmits a message to the user device to display a second modified alert having different visual appearance than the first alert. The system may monitor the communications from the user to detect action on the second alert by the user in a second period of time and may transmit a message to the user device to display a third modified alert having different visual appearance than the first and second alerts. The process may be repeated for multiple periods of times and the alerts may be varied from one visual appearance to a different visual appearance with each iteration of the process.

In some embodiments, the visual appearance of the alerts may be designated by the financial institution system 140 such that all users receive an alert having the same visual appearance for the same type of alert condition. In other embodiments, the user may have input into the visual appearance of the alert. For example, referring to FIG. 5 the menu 201 may provide a drop down menu 215 of visual styles and appearances of alerts from which the user may select based on the type of alert condition, the transaction type, the account type or the like. The financial institution system 140 or the user device 111 may save the user preferences for the alert appearance such that when an alert is provided for a particular matter the alert has the appearance selected by the user. In this manner the user may quickly and easily identify alerts and the type of alert condition to which it relates without the need of reading or otherwise processing the substance of the alert.

In addition to alphanumeric text the alerts may be provided with icons or symbols 221 that identify the message as an alert such that the user may quickly and easily identify alerts. The appearance of the icon associated with the alert condition may be selected based on the type of alert condition. As shown in FIGS. 7 and 8, for example, an icon associated with a high urgency alert condition may be a red alarm 221a, an alert for a medium urgency level alert condition may be yellow triangle 221b and an alert for a low urgency alert condition may be a green circle 221c. In one embodiment the icon may be selected by the user such that each different type of alert conditions, or groups of alerts conditions, have a different icon. Menu 201 may provide a drop down menu 217 (FIG. 5) of available alert icons and from which the user may select based on the type of alert condition such as the transaction type, the account type or the like. In other embodiments, the visual appearance of the alerts may be designated by the financial institution system 140 such that all users receive an alert having the same icon for the same type of alert condition. The financial institution system 140 or the user device 111 saves the user preferences for the alert icons such that when an alert icon is provided with an alert for an alert condition the alert icon has the appearance selected by the user that allows the user to quickly and easily identify the type of alert condition, matter, account, transaction or the like to which the alert relates. The icons may be selected to indicate urgency, priority or the like such that in addition to identifying the type of alert condition the icon also provides a visual indication as to the urgency of the alert.

The use of alphanumeric text and icons, images or other visual indicators may be combined in a single alert. Moreover, the styles, types, colors, and shapes of the alerts may vary from those specifically described herein.

The visual appearance of the alert may also be selected by the financial institution system 140 based on the response of the user. For example in one embodiment, as illustrated in FIG. 9, the financial institution system 140 may transmit different types of alerts to the user device 111 where the different types of alerts have different visual appearances as previously explained (Block 901). The financial institution system 140 monitors the user's response to the different types of alerts (Block 902) and tracks the response rate to the different types of alerts (Block 903). The system may monitor and track which alert is opened by the user, or which alert causes the user to take other action. For example, the alert may include an associated user input that may be selected by the user that transmits a response message to the financial institution system indicating that the user has received, read and acted upon the alert (Block 904). The financial institution may monitor and track the response messages to determine the responsive ness of the user to the alert. For example, the alert may include an associated user input such as a soft button 219 that the user pushes that indicates that the user has read the alert or the alert may have a link 223 to an account or other information that the user may select to take further action. The system may track not only if the user responded to the alert but also which type of response the user made. For example, the system may monitor and distinguish between the user dismissing the alert versus the user selecting a button such as a link that takes further action. In this manner the system may distinguish between an alert that is read by the user and an alert that is acted upon by the user. Each alert may be provided with a plurality of user inputs such that the user has the option of dismissing the alert and the option of taking further action. The responses of the user are analyzed to determine the effectiveness of the different types of alerts such as by determining which type of alert generates the most, fastest or best response from the user (Block 905). The responsiveness of the user to different types of alerts may be used to rank or rate the different types of alerts to establish the type of alert that works best for a particular user (Block 906). The different types of alerts may then be matched to the different alert conditions based on the ratings (Block 907). For example, the different types of alerts may be rated from most responsive to least responsive and the urgency of the alert condition may be matched to the responsiveness of the user. For example, the most urgent alert conditions may be provided with the type of alert that the user responds to the best while the least urgent alert condition may be provided with the type of alert that the user responds to the slowest. Other relationships between the alert ratings and the alert condition may also be used. This information may be updated such that the type of alert displayed for a given alert condition may be changed over time (Block 908). In some embodiments the relationship between the alert condition and alert type may be selected by the financial institution.

In some embodiments, the visual appearance of the alert may also be determined by the financial institution system 140 based on the aggregated responses of selected users of the institution. The users selected for the sample may be all of the users or a subset of the users. The subset of users may be based on characteristics of the users such that the responses of similarly situated users may be aggregated for purposes of determining the type of alert to be used with a particular alert condition. The system operates in a manner similar to that describe with respect to FIG. 9. Referring to FIG. 10, the financial institution system 140 may transmit different types of alerts to the selected user devices 111 where the different types of alerts for different alert conditions have different visual appearances as previously explained (Block 1001). The financial institution system 140 monitors the selected users' responses to the different types of alerts (Block 1002) and tracks the response rate to the different types of alerts (Block 1003). The system may monitor and track which alert is opened by the selected users, or which alert causes the selected users to take other action. For example, the alert may include an associated user input such as a soft button 219 or link 221 as previously described that may be selected by the user that transmits a response message to the financial institution system indicating that the user has received, read and acted upon the alert (Block 1004). The financial institution may monitor and track the response messages to determine the responsiveness of the selected users to the alert. The system may track not only if the users responded to the alert but also which type of responses the users made. For example, the system may monitor and distinguish between a user canceling or dismissing the alert versus a user selecting a button that takes further action. In this manner the system may distinguish between an alert that is read by the user and an alert that is acted upon by the user. Each alert may be provided with a plurality of user inputs such that the user has the option of dismissing the alert and the option of taking further action. The responses of the users are aggregated and analyzed to determine the effectiveness of the different types of alerts such as by determining which type of alert generates the most, fastest or best response from the users (Block 1005). The responsiveness of the aggregated users to different types of alerts may be used to rank or rate the different types of alerts to establish the type of alert that works best for the selected users (Block 1006). The different types of alerts may then be matched to the different alert conditions based on the alert ratings (Block 1007). For example, the different types of alerts may be rated from most responsive to least responsive and the urgency of the alert condition may be matched to the responsiveness of the users. For example, the most urgent alert conditions may be provided with the type of alert that the users in the aggregate respond to the best while the least urgent alert condition may be provided with the type of alert that the users in the aggregate respond to the slowest. Other relationships between the alert ratings and the alert conditions may also be used. This information may be updated such that the type of alert displayed for a given alert condition may be changed over time (Block 1008). In some embodiments the relationship between the alert condition and alert type may be selected by the financial institution In some embodiments of the invention one or more of the systems described herein may be combined with each other, or otherwise perform the functions of the other systems described herein. In other embodiments of the invention one or more of the applications described herein may be combined with each other, or otherwise perform the functions of the other applications described herein. Furthermore, the applications may be any type of application, such as an application stored on a desktop, server, or other device, a mobile application stored on a mobile device, a cloud application, or other like application. As such, the applications described herein, or portions of the applications described herein may be stored and operated on any of the systems or devices described herein. For example, a portion of one or more applications may be stored on the user device, or may be included as a portion of financial institution applications, such as an online banking application, in order to achieve embodiments of the inventions described herein.

It should be understood, that the systems and devices described in FIG. 1, or other devices not specifically described herein, may be configured to establish a communication link with each other in order to accomplish the steps of the processes described herein. The link may be an internal link within the same entity (e.g., within the same financial institution or device provider) or a link with the other systems of entities (e.g., social networking systems, third-party systems, or the like). In some embodiments, the systems may be configured for monitoring the applications and devices that the system(s) utilize as data sources. The information received from monitoring may be provided via wireless network path portions through the Internet. When the systems or devices are not monitoring a source or are not being monitoring, the information need not be transmitted from the source through the Internet to the destination, although it could be. The sources of information may be made continuously available, however, continuously available does not necessarily mean that the sources actually continuously generates data, but that a source is continuously available to generate and send data real-time (e.g., instantaneously and/or within a few seconds, or the like) of receiving a request for it. In any case, the sources may be continuously available to receive and/or generate information, in some cases in digitized data in Internet Protocol (IP) packet format. In response to continuously monitoring the real-time data feeds from the various systems or devices, the system may be configured to provide target information to the user and/or allow the user to make changes to or control the applications and/or devices.

Moreover, it should be understood that the process flows described herein include transforming the information sent and/or received from the applications of the different systems (e.g., internally or externally) and/or the devices from one or more data formats into a data format associated with an application for display to the user on the user device. There are many ways in which information is converted within the system environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may converting to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. patent application Ser. No. | Title | Filed On |
|---|---|---|---|
| 7427US1.014033.2890 | 15/288,565 published as U.S. Patent Publication No. 2018/0101854 | LEVERAGING AN ARTIFICIAL INTELLIGENCE ENGINE TO GENERATE CUSTOMER-SPECIFIC USER EXPERIENCES BASED ON REAL-TIME ANALYSIS OF CUSTOMER RESPONSES TO RECOMMENDATIONS | Concurrently herewith |
| 7428US1.014033.2891 | 15/288,797 published as U.S. Patent Publication No. 2018/0101900 | REAL-TIME DYNAMIC GRAPHICAL REPRESENTATION OF RESOURCE UTILIZATION AND MANAGEMENT | Concurrently herewith |
| 7428US2.014033.2892 | 15/288,819 published as U.S. Patent Publication No. 2018/0101568 | SYSTEM FOR TRANSMISSION AND USE OF AGGREGATED METRICS INDICATIVE OF FUTURE CUSTOMER CIRCUMSTANCES | Concurrently herewith |
| 7431US1.014033.2901 | 15/288,826 published as U.S. Patent Publication No. 2018/0103086 | SYSTEM FOR AUTOMATICALLY ESTABLISHING OPERATIVE COMMUNICATION CHANNEL WITH THIRD PARTY COMPUTING SYSTEMS FOR SUBSCRIPTION REGULATION | Concurrently herewith |
| 7431US2.014033.2902 | 15/288,833 published as U.S. Patent Publication No. 2018/0103112 | SYSTEM FOR AUTOMATICALLY ESTABLISHING AN OPERATIVE COMMUNICATION CHANNEL TO TRANSMIT INSTRUCTIONS FOR CANCELING DUPLICATE INTERACTIONS WITH THIRD PARTY SYSTEMS | Concurrently herewith |

What is claimed is:

1. An entity system comprising:
a network communication interface;
a memory device storing an application;
a processing device operatively coupled to the memory device, wherein the processing device is configured to execute computer-readable program code to:
transmit alerts to a user device in response to alert conditions, wherein each alert of the transmitted alerts has a different visual appearance;
monitor responses to the alert from the user device, wherein monitoring the responses further comprises identifying each alert that the user takes action on based on the different visual appearance presented by each alert;
rank each alert of the transmitted alerts based on the user taking action and the time it took for the user to take the action; and
update and alter the visual appearance of financial institution alerts, wherein urgent alert conditions receive high ranked alerts based on the ranking of each alert of the transmitted alerts.

2. The system of claim 1, wherein the processing device is configured to execute computer-readable program code to select from at least two different types of alerts.

3. The system of claim 2, wherein the two different types of alerts comprise different icons having different visual appearances.

4. The system of claim 2, wherein the two different types of alerts are associated with two different alert conditions.

5. The system of claim 2, wherein the two different types of alerts are based on the responsiveness of the user device.

6. The system of claim 5, wherein the two different types of alerts are based on the urgency of the alert conditions.

7. The system of claim 1, wherein the entity system is a financial entity system and the alert conditions relate to a user account information.

8. An entity system comprising:
a network communication interface;
a memory device storing an alert application;
a processing device operatively coupled to the memory device, wherein the processing device is configured to execute computer-readable program code to:
transmit alerts to a plurality of user devices in response to alert conditions, wherein each alert of the transmitted alerts has a different visual appearance;
monitor responses to the alert from the plurality of user devices wherein monitoring the responses further comprises identifying each alert that the user takes action on based on the different visual appearance presented by each alert;
rank each alert of the transmitted alerts based on the user taking action and the time it took for the user to take the action; and
alter the visual appearance of financial institution alerts, wherein urgent alert conditions receive high ranked alerts based on the ranking of each alert of the transmitted alerts.

9. The system of claim 8, wherein the processing device is configured to execute computer-readable program code to select from at least two different types of alerts based on the aggregate data from the plurality of user devices.

10. The system of claim 9, wherein the two different types of alerts are associated with two different alert conditions.

11. The system of claim 9, wherein the two different types of alerts comprise different icons having different visual appearances.

12. The system of claim 9, wherein the two different types of alerts are based on the aggregate responsiveness of the plurality of user devices.

13. The system of claim 11, wherein the two different types of alerts are based on not detecting an action of the user in response to the alert within a predetermined period of time.

14. A computer-implemented method comprising:
providing a computing system comprising a computer processing device and a non-transitory computer readable medium, where the computer readable medium comprises configured computer program instruction code, such that when said instruction code is operated by said computer processing device, said computer processing device performs the following operations:
transmitting alerts to a user device in response to alert conditions, wherein each alert of the transmitted alerts has a different visual appearance;
monitoring responses to the alert from the user device, wherein monitoring the responses further comprises identifying each alert that the user takes action on based on the different visual appearance presented by each alert;
ranking each alert of the transmitted alerts based on the user taking action and the time it took for the user to take the action; and
updating and altering the visual appearance of financial institution alerts, wherein urgent alert conditions receive high ranked alerts based on the ranking of each alert of the transmitted alerts.

15. The computer-implemented method of claim 14, wherein the alerts comprise least two different types of alerts and the at least two types of alerts comprise different icons having different visual appearances and are associated with two different alert conditions.

16. The computer-implemented method of claim 14, wherein the alert conditions relate to a user account information at a financial institution.

* * * * *